May 27, 1930.  F. N. BARDWELL  1,759,833
FLEXIBLE DRIVING MEANS
Filed Aug. 12, 1927
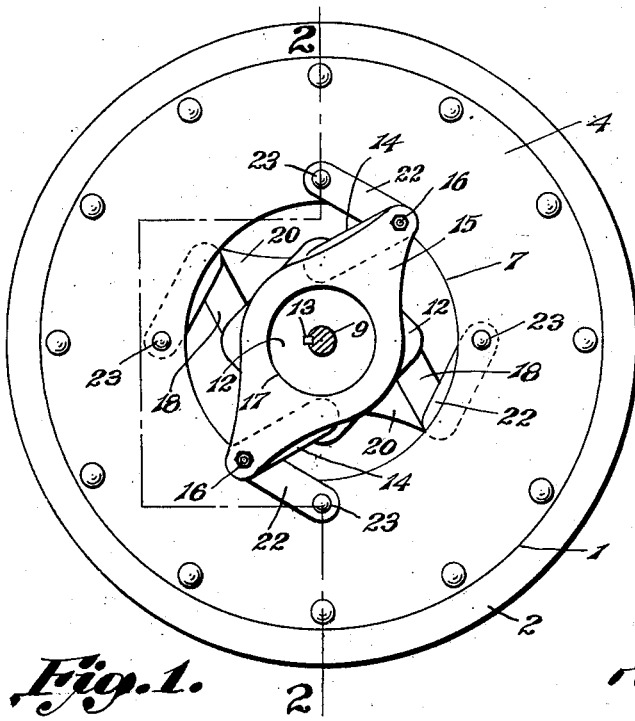
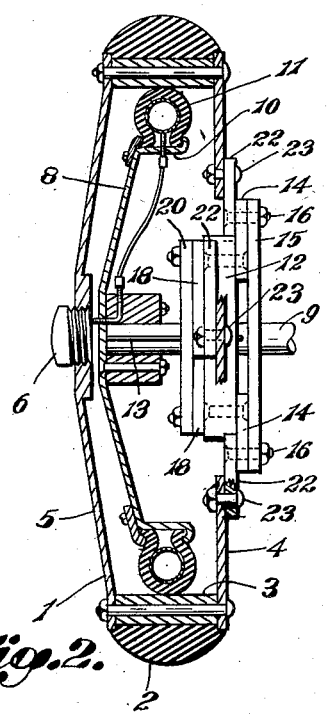
INVENTOR
Francis N. Bardwell
BY Howard P. King
ATTORNEY Patented May 27, 1930

1,759,833

UNITED STATES PATENT OFFICE

FRANCIS N. BARDWELL, OF PASSAIC, NEW JERSEY

FLEXIBLE DRIVING MEANS

Application filed August 12, 1927. Serial No. 212,408.

This invention relates to flexible driving means, and pertains particularly to a flexible driving means for a wheel such as shown in my prior Patent 1,378,756 of May 17, 1921.

The objects of the invention are to provide an improved and simplified flexible driving means for the outer member of a wheel as shown in said patent; to provide a driving means wherein the noise and wear of gears may be avoided and eliminated; to provide few, simple and sturdy parts which will stand the wear and tear to which they are subjected; to provide complete flexibility regardless of which peripheral direction the deflecting force is applied; to secure simplicity of construction and operation; and to obtain other advantages and results as may be brought out in the following description.

Referring to the accompanying drawing in which like numerals of reference indicate similar parts throughout the several views;

Figure 1 is a face view of a wheel embodying my invention showing the parts in normal position;

Figure 2 is a sectional view on line 2—2 of Fig. 1;

Figure 3 is a face view similar to Fig. 1, showing the parts and position resulting from pressure applied downwardly on the axle and upwardly on the tread; and Figure 4 is a sectional view on line 4—4 of Fig. 3.

In the specific embodiment of the invention illustrated in said drawing, the reference numeral 1 indicates the outer member of a wheel, said outer member having a tread 2, a felly 3 and inner and outer discs 4 and 5 extending inwardly from the felly at opposite sides thereof toward the center of the wheel. The outer disc 5 provides a comparatively small center aperture closed by any suitable hub cap 6. The inner disc 4 provides a larger opening 7 as clearly shown in Figures 1 and 3. Mounted within the outer member 1 of the wheel is an inner member 8 mounted on the axle 9 in fixed relation with respect thereto so as to be rotated thereby. The inner member provides a rim 10 for receiving a flexible or pneumatic tire 11. The parts are so arranged and proportioned as to cause the tire 11 to substantially fit between the rim 10 of the inner member and the inner surface of the felly 3 of the outer member. Consequently, the two members of the wheel will rotate concentrically under normal conditions. However, the inner member is supported flexibly and accordingly may become excentric with respect to the outer member under application of pressure as shown in Figures 3 and 4.

In order to drive the inner and outer members of the wheel simultaneously either in concentric or excentric relation, I provide a flexible drive in which the present invention inheres more particularly. As shown, I mount a plate 12 on shaft 9 non-rotatably with respect thereto as by use of key 13, said plate being substantially within the opening 7 of the inner disc 4 of the outer member 1 of the wheel. This plate 12 is smaller than the said opening 7 so as to have a latitude of movement as great as the permitted excentricity between the inner and outer wheel members. This plate is joined by links 14, 14 to a spanner 15. The said links 14, 14 are preferably on the same side of plate 12 but pivoted thereto at points diametrically opposite each other with respect to the axle 9, and extend downwardly away from the plate in opposite directions with their opposite ends pivoted, as by studs 16, to opposite ends of said spanner 15. The spanner 15 provides a central opening 17 around axle 9 and far enough from the same so as to permit a latitude of movement as great as the permitted excentricity of the inner and outer wheel members. Likewise, at two other diametrically opposite points of the plate, preferably a quarter of a turn around the same from the pivoting of links 14 thereto, are pivoted two other links 18, 18 which project outwardly from the plate in opposite directions to each other and are preferably on the opposite side of said plate from the links above described, thus providing one pair of links on one side of the plate and another pair of links on the opposite side of the plate. These links of this second pair are likewise pivoted, as at 19, to a spanner 20. It is to be understood that this spanner also has a central opening 21 to permit the desired excentric movement and also that this spanner is preferably at the opposite side of plate 12 from the other spanner 15. Both the spanners are in planes perpendicular to the axis of rotation, but the general direction of the two spanners is at right angles with respect to each other. At each outer end of each spanner I provide a link 22 pivoted thereto, and each link is pivoted at its outer end, as at 23, to the disc 4 of the outer member of the wheel. As shown, these links 22 are preferably carried on the same pivots 16 and 19 which mount links 14 and 18 pivotally to the ends of the spanner.

In normal operation of the wheel, the plate 12 and spanners 15 and 18 rotate concentrically with the axle 9. However, when there is a relative pressure between axle 9 and tread 2 of the outer member, axle 9 assumes an excentric position with respect to the outer member and opening 7 in a disc 4 thereof. The pivotal and link connection from plate 12 to the disc 4 accommodates this excentricity, it being noted that plate 12 remains fixed on axle 9 and accordingly concentric therewith. At the same time, swinging of the several links will result in an excentricity of the spanners 15 and 20. Therefore, the moments of force exerted by the torque in axle 9 will be transmitted from plate 12 through the links to disc 4, and the links will be held in proper relationship and prevented from responding to otherwise displacing forces by the spanners 15 and 19, which, it will be observed, extend from the elbows of the pairs of links.

It is to be noted that for purposes of clarity I have shown each link as a single unit, and have shown the flexible driving means of which the links form part, applied to one disc of the wheel only, however, the links may obviously be bifurcated or otherwise constructed than in the simple form shown in the drawing, may be duplicated together with other parts, as may be found expedient or desirable in the actual construction and use of the invention. Furthermore, other detail changes and modifications may be made in the construction and use of my flexible drive, and I do not wish to be understood as limiting myself to the exact construction shown except as set forth in the following claims when construed in the light of the prior art.

Having thus described my invention, I claim:—

1. A flexible drive for wheel members comprising a driving member and a driven member, a plurality of opposite pairs of links with the pairs of links evenly spaced from each other, and each pair of links having one link pivoted to the driving member and its other link pivoted to the driven member, said links of each pair being also pivoted to each other, and independent spanners connecting opposite pairs of links at their point of pivotal connection.

2. A flexible drive for wheel members comprising a driving member and a driven member, a plurality of pairs of links with the pairs of links evenly spaced from each other, and each pair of links having one link pivoted to the driving member and its other link pivoted to the driven member, said links of each other pair being also pivoted to each, all of said pivotal connections being close fitting so as to avoid lost motion between the parts, and a spanner pivotally connected with a rotatable close fit at its opposite ends to each of the pivots connecting the pairs of links.

3. A flexible drive for wheel members comprising a driving member and a driven member, a plurality of opposite pairs of links with the pairs of links evenly spaced from each other, and each pair of links having one link pivoted to the driving member and its other link pivoted to the driven member, said links of each pair being also pivoted to each other, and a plurality of spanners, each spanner being pivotally connected at its opposite ends to the pivots connecting opposite pairs of links so said spanners may move independent of each other under the influence of the respective pairs of links.

FRANCIS N. BARDWELL.